(12) United States Patent
Boehler et al.

(10) Patent No.: US 6,612,177 B2
(45) Date of Patent: Sep. 2, 2003

(54) DEVICE FOR MEASURING THE PRESSURE OF LIQUID OR GASEOUS MEDIA

(75) Inventors: Ewald Boehler, Wolfach (DE); Joern Jakob, Wolfach-Kirnbach (DE); Manfred Liehr, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/887,557

(22) Filed: Jun. 25, 2001

(65) Prior Publication Data

US 2002/0023499 A1 Feb. 28, 2002

(30) Foreign Application Priority Data

Jun. 30, 2000 (DE) .......................................... 100 31 135

(51) Int. Cl.⁷ ................................................. G01L 7/08
(52) U.S. Cl. ........................................... 73/715; 73/706
(58) Field of Search .................................... 73/700–756

(56) References Cited

U.S. PATENT DOCUMENTS

| | | | |
|---|---|---|---|
| 5,157,972 A | | 10/1992 | Broden et al. |
| 5,665,921 A | * | 9/1997 | Gerst et al. .................... 73/715 |
| 5,880,373 A | * | 3/1999 | Barton ......................... 73/754 |
| 6,374,680 B1 | * | 4/2002 | Drewes et al. ................. 73/718 |
| 6,401,546 B1 | * | 6/2002 | Kocian et al. ................. 73/756 |

FOREIGN PATENT DOCUMENTS

| | | |
|---|---|---|
| DE | 88 15 425 | 5/1990 |
| DE | 39 12 217 | 10/1990 |
| DE | 41 11 119 | 10/1992 |
| EP | 0 421 394 | 4/1991 |
| EP | 0 764 839 | 3/1997 |
| WO | WO 99/34185 | 7/1999 |

* cited by examiner

*Primary Examiner*—Hezron Williams
*Assistant Examiner*—Andre Allen
(74) *Attorney, Agent, or Firm*—Nath & Associates PLLC; Gary M. Nath; Jerald L. Meyer

(57) ABSTRACT

The present invention pertains to a pressure-measurement device with a pressure sensor (1) for measuring the pressure of liquid or gaseous media and with a diaphragm seal (2) that subjects measuring diaphragm (11) of pressure sensor (1) to a pressure to be measured. Pressure sensor (1) has a connection part (12) made of a ceramic material which is connected to measuring diaphragm (11) on the diaphragm side via a joint (14) that is diffusion-tight towards the exterior, and is connected diffusion-tightly to diaphragm seal (2) on the diaphragm seal side. In this way, it is assured that no gases or water vapor can enter the pressure-transfer medium via pressure sensor (1). The operational mode of the pressure transducer remains functional over a long time, and particularly at high temperatures.

13 Claims, 3 Drawing Sheets

DEVICE FOR MEASURING THE PRESSURE OF LIQUID OR GASEOUS MEDIA

BACKGROUND OF THE INVENTION

The present invention pertains to a pressure-measurement device of the type specified in the preamble of claim 1.

A partial cross section of a known pressure-measurement device is shown in FIG. 1. Such pressure-measurement devices have at their end face, between the diaphragm seal housing 20 of diaphragm seal 2 and the base body 10 of pressure sensor 1, an elastomer gasket 3. A fluid, silicone oil or hydraulic oil is typically provided as the pressure transfer medium between diaphragm seal 2 and measuring diaphragm 11 of pressure sensor 1, and is filled into the pressure transducer in a well-degassed and nearly water-free state.

The problematic feature of such sensors, however, is the increasing leakiness of the elastomer gasket between diaphragm seal and pressure sensor. Over time and especially as temperatures rise, an increased gas permeability of the elastomer gasket occurs with such sensors. This leakiness of the elastomer gasket then leads to an ever-increasing measurement error. The gas permeability of the elastomer gasket results in an exchange of gas with the environment, which may cause so much gas to penetrate from the environment into the pressure sensor and to become dissolved in the pressure transfer medium that the vapor pressure of the gases dissolved in this pressure transfer medium corresponds to the external pressure of the gases against the elastomer gasket. If the gas in the pressure transfer medium escapes again, for instance, during depressurization, and thus fills the interior of the diaphragm seal, then an undefined elevated and unstable pressure signal results which is measured by the pressure sensor and makes accurate and reliable measurement of pressure impossible.

In addition to gas, of course, water vapor from, for instance, humid air can also penetrate through the elastomer gasket into the pressure transducer. At temperatures above 100° C., the vapor pressure of the infiltrated water is greater than atmospheric pressure and likewise leads to the previously mentioned elevation of internal pressure in the sensor and thus to measurement errors.

BRIEF SUMMARY OF THE INVENTION

The present invention is therefore based on the problem of providing a pressure-measurement device of the initially mentioned type which has a better seal between diaphragm seal and pressure sensor, especially at higher temperatures.

According to the invention, this problem is solved by a pressure transducer with the characteristics of claim 1.

According to the latter, a generic pressure-measurement device is provided which is characterized in that the pressure sensor has a connection part made of a ceramic material that is coupled on the diaphragm side to the measuring diaphragm via a second diffusion-tight joint and is coupled on the diaphragm-seal side via a third diffusion-tight joint to the diaphragm seal.

It is guaranteed by the present invention that the measuring diaphragm is sealed on both the pressure sensor side and the diaphragm seal side by way of respective diffusion-tight joints. It is assured in this way that no gases or water vapor can reach the pressure-transfer medium. Thus the operational mode of the pressure transducer remains functional over a long time, and particularly at high temperatures.

The joints between measuring diaphragm and connection part or base body are preferably embodied as glass solder joints. These glass solder rings exhibit the advantage that they are electrical insulators, are temperature-resistant even at high temperatures, and do not permit any diffusion of gases or hydrogen from the outside to the inside.

In an advantageous configuration, an adapter is provided between the connection part and the diaphragm seal housing, and is joined to the latter by flanges and diffusion-tight joints.

It is particularly advantageous if the adapter and the connection part have identical or very similar coefficients of thermal expansion. In a typical configuration, the base body as well as the connection part and the adapter consist of a ceramic material, i.e., they each have a similar coefficient of thermal expansion of roughly $8 \times 10^{-6}$/K.

In a preferred embodiment of the invention, the base body and/or the connection part and/or the adapter and/or the measuring diaphragm consist of an oxide material such as $Al_2O_3$ ceramic, SiC ceramic, glass ceramic, quartz or $ZrO_2$ ceramic.

The adapter is expediently joined, stress-free, with hard solder via an annular flange to the connection part of the pressure sensor. Since the connection part and the adapter typically feature [sic; consist of] a material with similar or identical coefficients of expansion, a joint between these parts that is stable over the long term and diffusion-tight is thus guaranteed. On its end face opposite the diaphragm seal housing, the adapter is welded by a weldment joint to a projecting flange, consisting of special steel of the diaphragm seal housing. The differing coefficients of expansion between the adapter and the diaphragm seal housing are equalized here by the weld. The annular peripheral weld typically has a smaller diameter than the annular flange for the hard solder joint. Thereby, strains between the pressure sensor and the diaphragm seal can be reduced by the weld joint.

An oil, such as hydraulic oil or silicon oil, is typically employed as the pressure-transfer medium.

The pressure sensor is advantageously constructed as a capacitive pressure sensor or as a DMS pressure sensor. In this case, either the film electrode forms the measuring diaphragm or a circular or annular film electrode is formed on the measuring diaphragm. The other film electrode of the measuring capacitor is then arranged in the chamber between measuring diaphragm and base body, with a common, arc-resistant gas being used as the dielectric.

Additional advantageous configurations and refinements of the invention can be derived from the subordinate claims, the description below and the figures.

The invention is described in greater detail below on the basis of embodiments indicated in the figures of the drawing. Shown are:

BRIEF DESCRIPTION OF THE DRAWINGS

In all the figures of the drawing, identical or functionally identical elements are given identical reference numerals.

DETAILED DESCRIPTION

Figure 1:
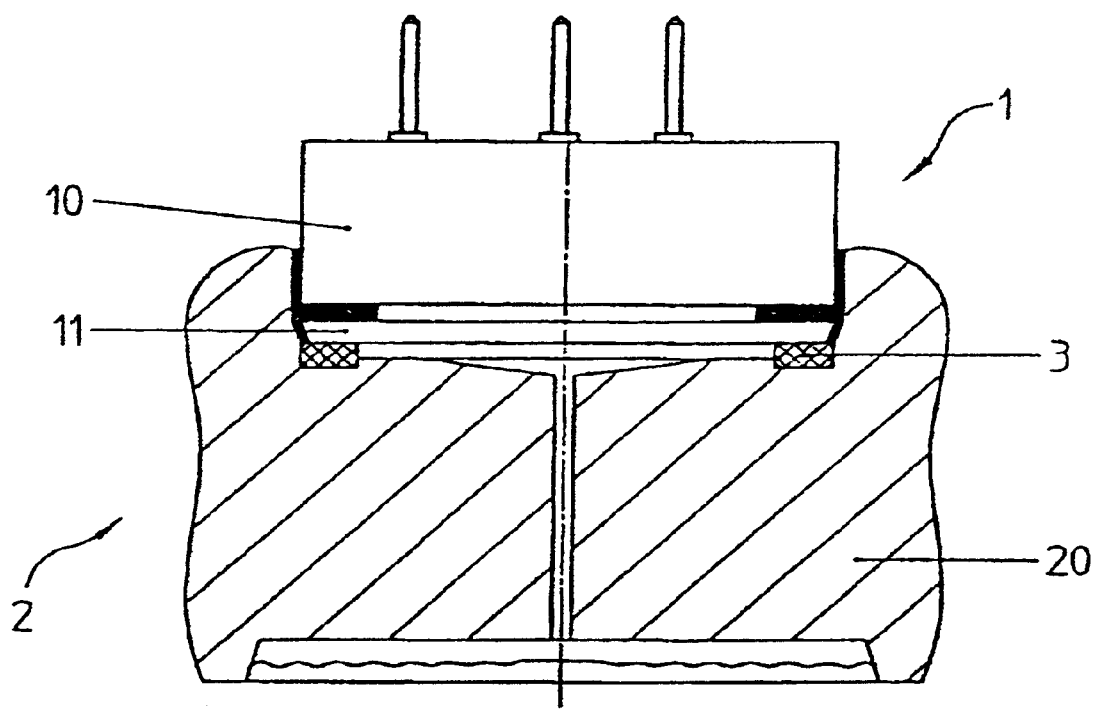
FIG. 1, a partial section through a conventional pressure-measurement device with a pressure sensor and a diaphragm seal.
Figure 2:
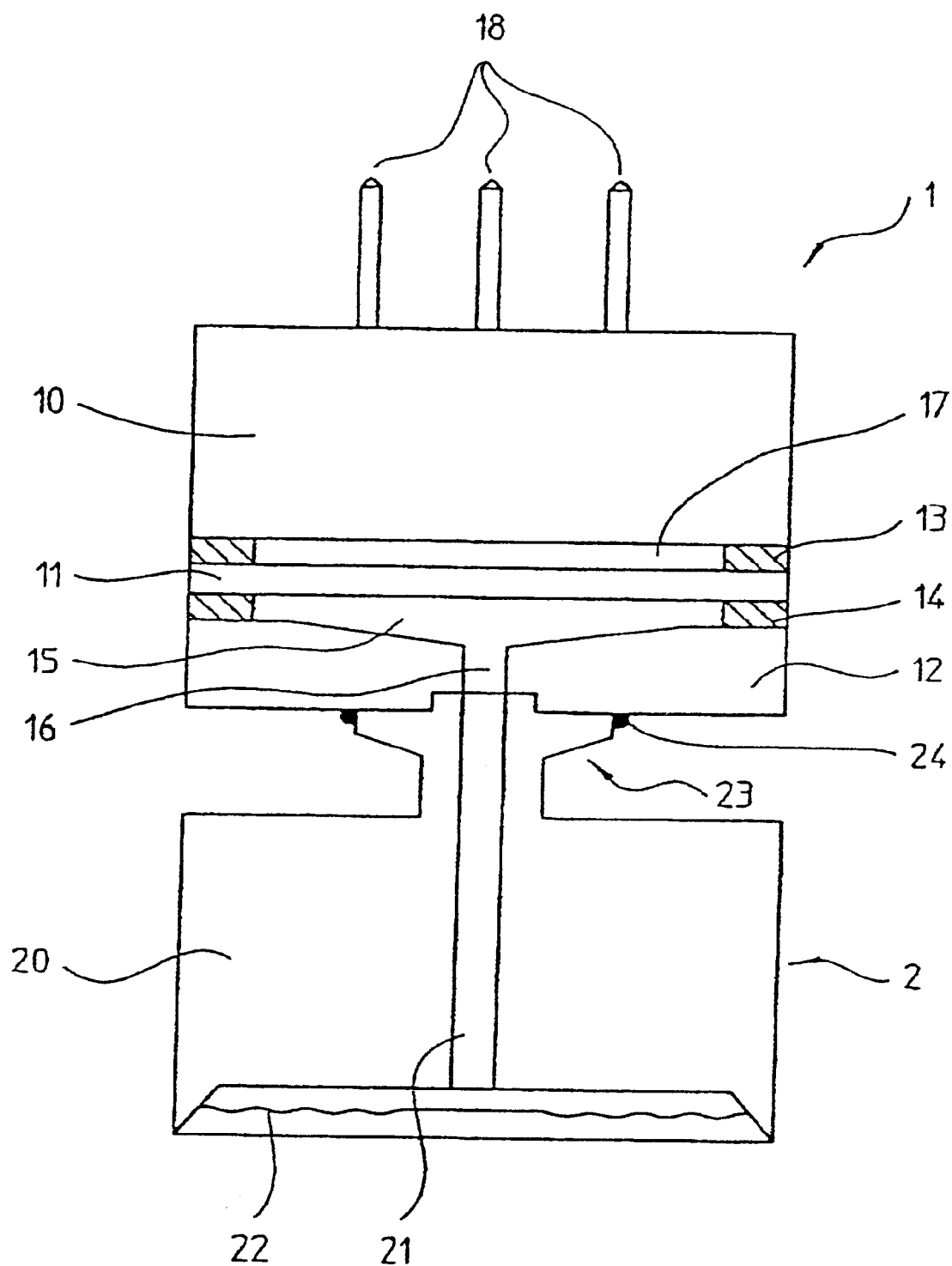
FIG. 2, a partial section through a first embodiment of a pressure-measurement device according to the invention with a pressure sensor and a diaphragm seal.

FIG. 2 shows a first embodiment of a pressure-measurement device in a partial cross section. In FIG. 2, a pressure sensor that is connected to a diaphragm seal 2 by way of a flange 23 is labeled 1. Pressure sensor 1 has a base body 10, a pressure-sensitive diaphragm 11, as well as a connection part 12. Measuring diaphragm 11 here is coupled between base body 10 and connection part 12 by respective annular joints 13, 14, which are diffusion-tight towards the exterior. Typically, these diffusion-tight joints 13, 14 are formed as a solder glass. On the diaphragm seal side, a chamber 15 that is coupled to diaphragm seal 2 by way of a drillhole 16 in connection part 12 is thus formed between measuring diaphragm 11 and connection part 12. Drillhole 16 and chamber 15 contain a pressure-transfer medium, silicone oil or hydraulic oil for instance, by means of which a pressure to be measured can be applied to measuring diaphragm 11. Between measuring diaphragm 11 and base body 10 there is a second chamber 17, typically evacuated or filled with gas. Pressure sensor 1 is designed such that it detects a pressure to be measured via measuring diaphragm 11 and converts it into an electrical signal, which is coupleable from pressure sensor 1 via contact pins 18.

Diaphragm seal 2 has a diaphragm seal housing 20 in which a drillhole 21 is placed. On the sensor end, diaphragm seal 2 is connected to pressure sensor 1 via a flange 23, flange 23 being joined to connection part 12 by means of a diffusion-tight joint 24. The diffusion-tight joint 24 here can be formed by a hard solder joint or as a weld. At the opposite end, a wide-area, pressure-sensitive separating diaphragm by means of which diaphragm seal 2 can detect a pressure to be measured is placed in familiar manner on diaphragm seal housing 20. Drillhole 21 is form-fit to drillhole 16, so that a pressure detected by separating diaphragm 22 can be applied to measuring diaphragm 11 via the pressure-transfer medium in drillholes 16, 21 and chamber 15.

Figure 3:
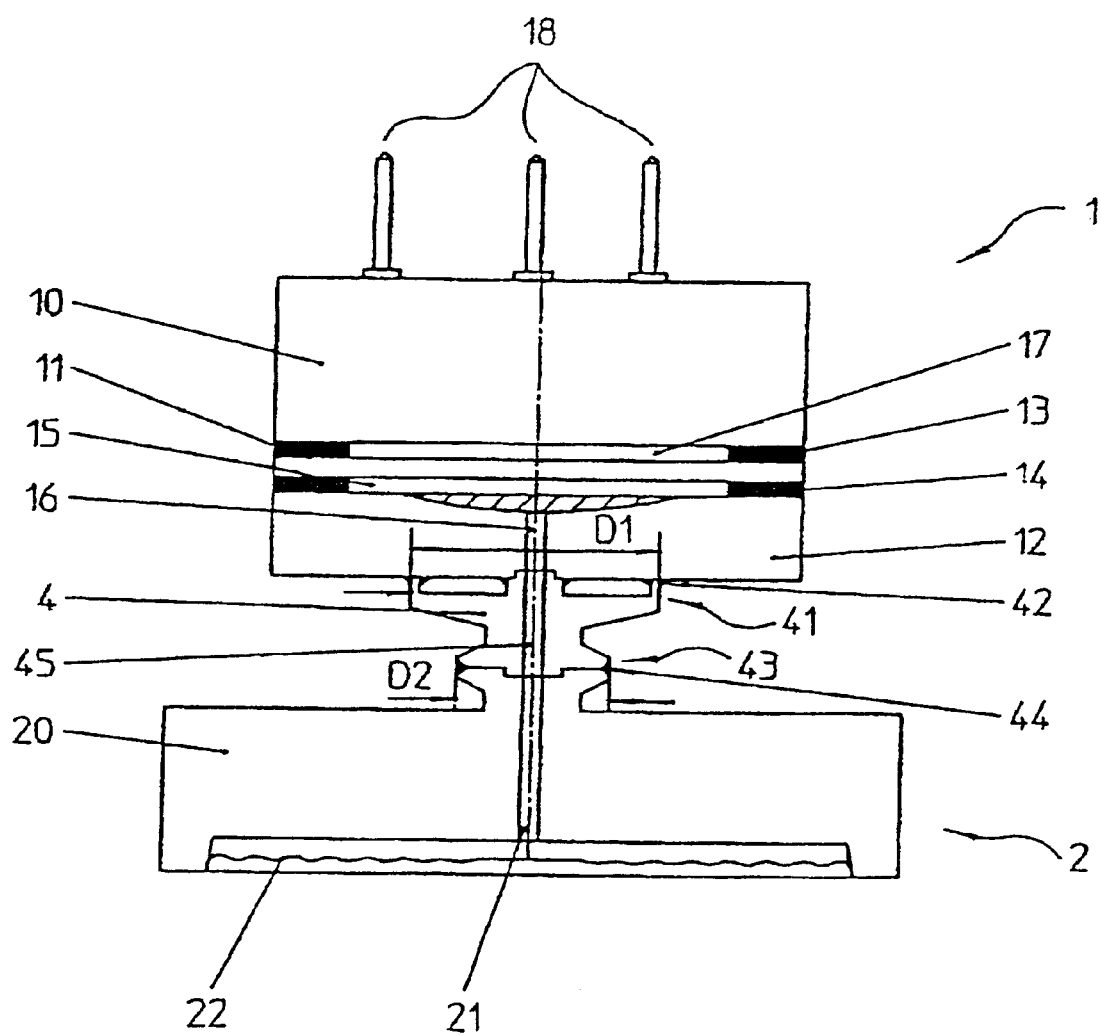
FIG. 3, a partial section through a second embodiment of a pressure-measurement device according to the invention, in which an adapter is provided between pressure sensor and diaphragm seal.

FIG. 3 shows, in partial cross section, a second pressure-measurement device which has been refined vis-a-vis the pressure-measurement device of FIG. 2. In FIG. 3, an adapter 4 is provided between pressure sensor 1 and diaphragm seal 2. Adapter 4 here is joined to connection part 12 of pressure sensor 1 by way of a first flange 41 and a first diffusion-tight joint 42, and to diaphragm seal housing 20 of diaphragm seal 2 by way of a second flange 43 and a second diffusion-tight joint 44. Adapter 4 likewise has a drillhole 45 passing through it, which is form-fit to drillholes 16, 21.

The materials used in the pressure-measurement devices shown in FIGS. 2 and 3 are described in further detail below.

Base body 10 and connection part 12 of pressure sensor 1 are formed in the present embodiments from a ceramic material, that is to say, they have a coefficient of thermal expansion of $8 \times 10^{-6}$/K. Diaphragm seal housing 20 consists of a corrosion-resistant material, such as ceramic, or of special steel in this instance, and thus has a coefficient of thermal expansion of roughly $16 \times 10^{-6}$/K.

Adapter 4 between pressure sensor 1 and diaphragm seal 2 consists in the embodiment in FIG. 3 of a metallic material with a coefficient of thermal expansion similar to that of connection part 12.

It would also be conceivable, however, for adapter 4 to consist of a ferronickel alloy. In the present embodiment, first flange 41 between ceramic connection part 12 and metallic adapter 4 is connected stress-free by means of a hard solder joint, a glass solder joint, a diffusion weld, or similar joints. At the other end of adapter 4, second flange 43 is connected between adapter 4 and special steel diaphragm seal housing 20 by means of an annular weld 44. It is particularly advantageous, as indicated in FIG. 3, if the diameter D1 of first flange 41 is very much larger than the diameter D2 of second flange 43. Stresses that occur between pressure sensor 1 and diaphragm seal 2 thus can already be reduced by first flange 43 [sic], which leads long-term to improved integrity of the pressure transducer.

Measuring diaphragm 11 consists of a common material with similar coefficients of thermal expansion to those of base body 10 or connection part 12, i.e., diaphragm 11 consists at least in part of a ceramic material. As already mentioned, diffusion-tight joints 13, 14 are formed as glass solder joints. Naturally, these joints can be made by any other joining material that has a similarly acceptable diffusion-reducing action to that of glass.

List of Reference Symbols
1 Pressure sensor
2 Diaphragm seal
3 Elastomer gasket
4 Adapter
10 Base body
11 Measuring diaphragm
12 Connection
13 Diffusion-tight joint, glass solder joint
14 Diffusion-tight joint, glass solder joint
15 First Chamber
16 Drillhole
17 Second chamber
18 Electrical contact-pins
20 Diaphragm seal housing
21 Drillhole
22 Separating membrane
23 Flange
24 Diffusion-tight joint
41 First flange
42 Hard solder joint, diffusion solder joint
43 Second flange
44 Weld seam
45 Drillhole
D1 First diameter
D2 Second diameter

What is claimed is:
1. Pressure-measurement device comprising
 a pressure sensor (1) for measuring the pressure of liquid or gaseous media that has a base body (10), at one end of which measuring diaphragm (11) is located which is coupled to base body (10) by way of a first diffusion-tight joint (13);
 a diaphragm seal (2) that subjects measuring diaphragm (11) to a pressure to be measured by way of a pressure-transfer medium;
 wherein the pressure sensor (1) has a connection part (12) of a ceramic material which is coupled, on the diaphragm side, by way of a second diffusion-tight joint (14) to measuring diaphragm (11), and on the diaphragm seal side by way of a third diffusion-tight joint (24) to diaphragm seal (2).
2. Pressure-measurement device according to claim 1, characterized in that first and/or second joints (13, 14) is/are formed as annular glass solder joints.
3. Pressure-measurement device according to claim 1, characterized in that an adapter device (4) is arranged between diaphragm seal (2) and pressure sensor (1) and is joined by way of diffusion-tight joining means (41, . . . , 44) both to the pressure-sensitive side of base body (10) and to diaphragm seal housing (20).
4. Pressure-measurement device according to claim 3, characterized in that adapter device (4) and connection part (12) have the same or at least similar coefficients of thermal expansion.

5. Pressure-measurement device according to claim 3, characterized in that base body (10) and/or connection part (12) and/or adapter device (4) and/or measuring diaphragm (11) consists/consist of a ceramic material.

6. Pressure-measurement device according to claim 3, characterized in that base body (10) and/or connection part (12) and/or adapter device (4) and/or measuring diaphragm (11) consists/consist at least in part of $Al_2O_3$ ceramic, SiC ceramic, glass ceramic, quartz or $ZrO_2$ ceramic.

7. Pressure-measurement device according to claim 3, characterized in that adapter device (4) consists at least in part of a ferronickel alloy.

8. Pressure-measurement device according to claim 3, characterized in that diaphragm seal housing (20) consists at least in part of metallic material, in particular, special steel.

9. Pressure-measurement device according to claim 3, characterized in that adapter device (4) is coupled to connection part (12) via a first annular flange (41) and a hard solder joint (42) or diffusion solder joint running circumferentially around first flange (41).

10. Pressure-measurement device according to claim 3, characterized in that adapter device (4) is joined to diaphragm seal housing (20) by way of a second annular flange (43) and a weld (44) running in an annular shape circumferentially around second flange (43).

11. Pressure-measurement device according to claim 10, characterized in that the diameter (D1) of hard solder joint or diffusion solder joint (42) is greater than the diameter (D2) of annular weld (44).

12. Pressure-measurement device according to claim 1, characterized in that oil, particularly, hydraulic oil or silicone oil, is provided as pressure-transfer medium.

13. Pressure-measurement device according to claim 1, characterized in that pressure sensor (1) is constructed as a capacitive pressure sensor, in which measuring diaphragm (11) constitutes one film electrode of the measuring capacitor, or a circular or annular film electrode is arranged on measuring diaphragm (11).

* * * * *